(12) United States Patent
He et al.

(10) Patent No.: US 8,649,288 B2
(45) Date of Patent: Feb. 11, 2014

(54) METHOD AND USER EQUIPMENT FOR ACQUIRING RANDOM ACCESS INFORMATION

(75) Inventors: Feng He, Shenzhen (CN); Yun Deng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 238 days.

(21) Appl. No.: 13/148,963

(22) PCT Filed: Feb. 10, 2010

(86) PCT No.: PCT/CN2010/070624
§ 371 (c)(1),
(2), (4) Date: Aug. 11, 2011

(87) PCT Pub. No.: WO2010/105518
PCT Pub. Date: Sep. 23, 2010

(65) Prior Publication Data
US 2011/0299415 A1    Dec. 8, 2011

(30) Foreign Application Priority Data
Mar. 19, 2009 (CN) .......................... 2009 1 0127691

(51) Int. Cl.
*H04L 12/26* (2006.01)
*H04W 4/00* (2009.01)

(52) U.S. Cl.
USPC ............................ 370/252; 370/328; 370/338

(58) Field of Classification Search
USPC ......................................... 370/252, 310–350
See application file for complete search history.

(56) References Cited

U.S. PATENT DOCUMENTS

| 6,697,346 | B1 * | 2/2004 | Halton et al. ................. 370/335 |
| RE43,949 | E * | 1/2013 | Park et al. .................. 455/452.2 |
| 2008/0045213 | A1 * | 2/2008 | Norris et al. ............... 455/435.1 |
| 2009/0262681 | A1 * | 10/2009 | Park et al. ...................... 370/328 |
| 2010/0034141 | A1 * | 2/2010 | Meylan ......................... 370/328 |
| 2010/0208597 | A1 * | 8/2010 | Chun et al. .................... 370/252 |
| 2011/0261752 | A1 * | 10/2011 | Fischer et al. ................. 370/328 |
| 2012/0008524 | A1 * | 1/2012 | Amirijoo et al. ............... 370/252 |

FOREIGN PATENT DOCUMENTS

| CN | 101064943 A | 10/2007 |
| CN | 101106409 A | 1/2008 |
| CN | 101388707 A | 3/2009 |
| JP | 2009055356 A | 3/2009 |
| WO | 2008023932 A1 | 2/2008 |
| WO | 2009022835 A2 | 2/2009 |

OTHER PUBLICATIONS

International Search Report in international application No. PCT/CN2010/070624, mailed on May 27, 2010.

(Continued)

*Primary Examiner* — Warner Wong
(74) *Attorney, Agent, or Firm* — Oppedahl Patent Law Firm LLC

(57) ABSTRACT

The present invention discloses a method and User Equipment (UE) for acquiring random access information. The method comprises: during a random access procedure, the UE measures and acquires parameter information in the random access procedure; and after the success of the random access, the UE reports partial or all of acquired parameter information to a base station. According to the present invention, the base station can optimize the random access according to the parameter information reported by the terminal, thereby improving the precision of the random access optimization.

16 Claims, 5 Drawing Sheets

(56) References Cited

OTHER PUBLICATIONS

English Translation of the Written Opinion of the International Search Authority in international application No. PCT/CN2010/070624, mailed on May 27, 2010.

L1 eNB measurements on PRACH resources Jan. 8, 2008.
UE reporting based PRACH control Nov. 12, 2007.
RACH Optimization Function Mar. 18, 2009.
E-UTRA MAC protocol specification update Mar. 25, 2008.
Supplementary European Search Report in European application No. 10753085.9, mailed on Jul. 12, 2012.

* cited by examiner

METHOD AND USER EQUIPMENT FOR ACQUIRING RANDOM ACCESS INFORMATION

TECHNICAL FIELD

The present invention relates to the field of communications, in particular to a method and User Equipment (UE) for acquiring random access information.

BACKGROUND

A Long Term Evolution (LTE) network consists of an evolved Universal Terrestrial Radio Access Network (E-UTRAN) and an Evolved Packet Core (EPC) and is of a flat structure, wherein the E-UTRAN can consist of a plurality of evolved base stations (i.e. evolved NodeB, eNB) connected with the EPC.

In the LTE system, if needing to interact with the network side, a UE needs to acquire uplink synchronization firstly and initiate a random access procedure. The random access procedure can be classified into competition-based random access procedure and non-competition-based random access procedure according to the mode.

FIG. 1 shows a flowchart illustrating the competition-based random access procedure, and as shown in FIG. 1, the competition-based random access procedure mainly comprises the following steps:

S101: a UE transmits a random access preamble on an uplink random access channel, wherein the time-frequency domain location for transmitting the preamble is associated with a Random Access Radio Network Temporary Identifier (RA-RNTI);

S103: after receiving the random access preamble, an eNB replies a random access response to the UE on a downlink shared channel, wherein the random access response comprises authorization for subsequent uplink scheduling of the UE by the eNB;

S105: if the UE identifies a response associated with the preamble transmitted in S101 on a downlink control channel according to the RA-RNTI, the UE performs the uplink scheduling according to the authorization obtained from the eNB in S103 and transmits an Msg3 to the eNB, wherein the Msg3 includes a UE identifier or a contention resolution identifier; a HARQ (Hybrid Automatic Repeat Request) repeat mechanism can be adopted in the process, i.e., if the eNB replies that the message has not been received (i.e. negative acknowledgement, NACK), the UE retransmits the Msg3; and S107: after receiving the Msg3, the eNB transmits an Msg4 to the UE according to the UE identifier; if the UE receives the message before a contention resolution timer is timeout and determines the Msg4 to be the Msg4 expected by the UE through unpacking, the UE determines that the random access procedure is successful; otherwise, the random access procedure is determined to be unsuccessful and a random access is reinitiated.

FIG. 2 shows a flowchart illustrating the non-competition-based random access procedure, and as shown in FIG. 2, the non-competition-based random access procedure mainly comprises the following steps (step S201-step S205):

S201: the eNB allocates a dedicated random access preamble for the UE through a dedicated signaling firstly, wherein, in the preamble, a time-frequency domain location for transmitting the random access is designated;

S203: the UE transmits the dedicated random access preamble in the designated time-frequency domain location; and S205: after receiving the random access preamble, the eNB replies a random access response to the UE on the downlink shared channel; if the UE identifies a response associated with the dedicated preamble transmitted in step S201 on a downlink control channel according to the RA-RNTI, the UE determines that the random access procedure is successful; otherwise, the random access procedure is determined to be unsuccessful and a random access is reinitiated.

Herein, there are 64 preamble sequence codes used for the random access in each cell, according to the competition-based and non-competition-based access mode, the preamble codes are divided into two groups; the preamble codes for the competition-based random access are further divided into two groups, Group A and Group B, according to the size of a subsequent Msg3 and the magnitude of the path loss during the measurement. Therefore, the 64 preamble codes are divided into three groups.

As it is possible that a plurality of UEs initiate the random access procedures simultaneously at a certain moment in the cell, the competition-based random access procedures using the preamble codes in the same group may lead to the occurrence of a contention phenomenon, thereby cause the failure of the random access procedure initiated by the UEs or the subsequent interaction between the UEs and the network side and finally cause a larger time delay for a call establishment and switching of partial UEs in the cell as well as a lower success rate. Furthermore, a Physical Random Access Channel (PRACH) needs to fixedly occupy partial air interface resources of the cell, so improper configuration of the PRACH will lead to waste of the radio resource of the cell. In order to solve the problem, it is possible to acquire the cell performance parameters by the field manual test method or the like after the establishment of the cell, and manually modify the corresponding configurations, so that the performance of the system is improved. However, because of the complexity of a radio environment and the time invariability of manually optimized system parameters, network optimization efficiency is low, which leads to an enormous amount of manpower costs.

At present, in order to reduce the manual maintenance workload and improve the optimization ability of the network, the Next Generation Mobile Network (NGMN) organization requires that the LTE needs to support the Self-Organized Network (SON) function, wherein the function includes a self-optimizing function of a random access channel. The parameter configuration of the cell (including the configuration of the random access channel) may be automatically optimized through the self-configuration function and self-optimizing function of the network. However, in order to optimize the network, the performance index of the current network must be acquired firstly, in the existing protocol of the LTE, the performance index is acquired by an input parameter of the random access optimization function, which is the number of times that the base station receives a Random Access Channel (RACH) preamble from the UE, and is counted by the base station.

However, the input parameter cannot reflect contention, delay, failure and other problems in the random access procedure caused by an improper PRACH configuration parameter. Therefore, the problem to be solved in the prior art is how to precisely acquire the input parameter information for the random access optimization.

SUMMARY

The present invention is provided for solving the problem that in the related technologies, parameters acquired cannot reflect the contention, delay, failure and other problems caused by the improper PRACH configuration parameters in the random access procedure. The present invention mainly aims to provide a method and UE for acquiring random access information to solve the problem above.

According to one aspect of the present invention, a method for acquiring random access information is provided.

The method for acquiring random access information, according to the present invention, comprises the following steps: during a random access procedure, a user equipment measures and acquires parameter information in the random access procedure; and after the success of the random access, the user equipment reports partial or all of acquired parameter information to a base station.

According to another aspect of the present invention, a user equipment is provided.

The user equipment according to the present invention comprises: a measuring module and a transmitting module, wherein the measuring module is arranged to measure and acquire parameter information in a random access procedure, and the transmitting module is arranged to transmit partial or all of parameter information acquired by the measuring module to a base station.

Through at least one of the solutions of the present invention, the UE measures parameter information in the random access procedure and reports the parameter information to the base station, wherein the parameter information comprises parameters respectively indicating contention information and delay information in the random access procedure, so that the base station can acquire more precise and comprehensive information in the random access procedure to solve the problem above in the prior art, and can optimize the random access according to the parameter information reported by the terminal to improve the precision of the random access optimization.

BRIEF DESCRIPTION OF THE DRAWINGS

The drawings herein are used for the further explaining the present invention and are a part of the present invention. Schematic embodiments and the descriptions are used for explaining the present invention, which are not intended to limit the present invention. In the drawings.

DETAILED DESCRIPTION

During a random access procedure, when optimizing a network through input parameters, the related parameter information reflecting the cases, such as contention, delay and failure occurring during the procedure cannot be precisely acquired. In order to solve the above problem, embodiments of the present invention provide technical solutions for acquiring random access information. In the embodiments of the present invention, a UE measures and counts the parameter information in the random access procedure. The parameter information measured by the UE comprises parameters respectively indicating contention information and delay information in the random access procedure. After the UE acquires the parameter information in the random access procedure, the UE reports partial or all of the acquired parameter information to the base station after the success of the random access.

It should be noted that, if not in conflict, the embodiments and features thereof in the application can be combined with one another. The present invention is detailed below in conjunction with the drawings and embodiments.

Method Embodiment

According to an embodiment of the present invention, firstly a method for acquiring random access information is provided.

Figure 1:
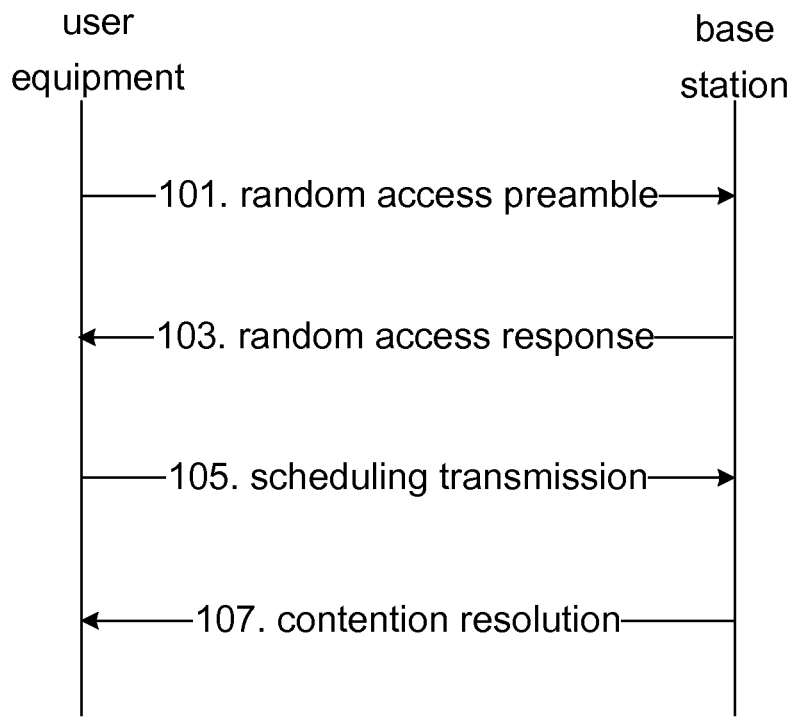
FIG. 1 shows a flowchart illustrating a competition-based random access procedure in the prior art.
Figure 2:
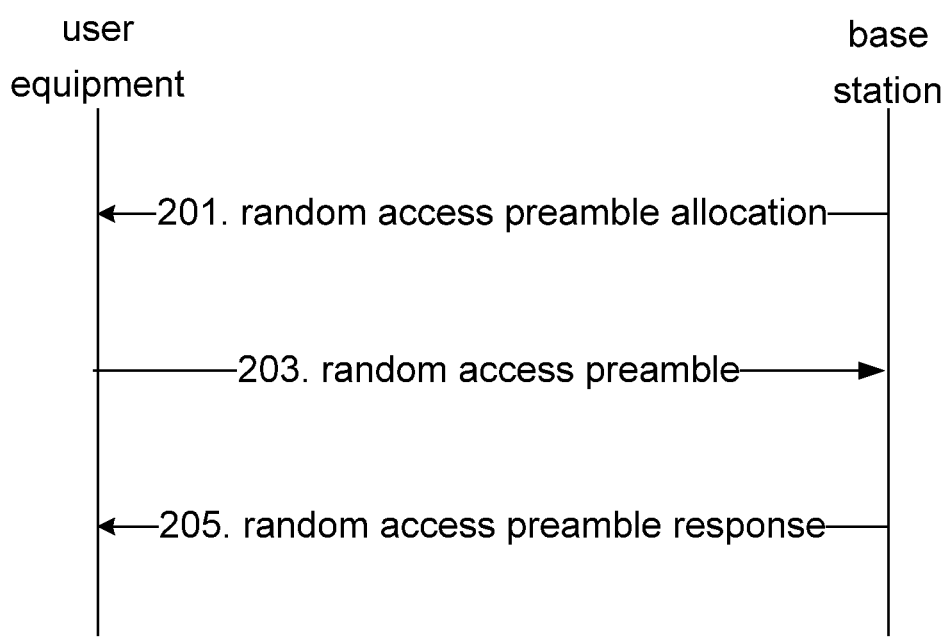
FIG. 2 shows a flowchart illustrating a non-competition-based random access procedure in the prior art.
Figure 3:
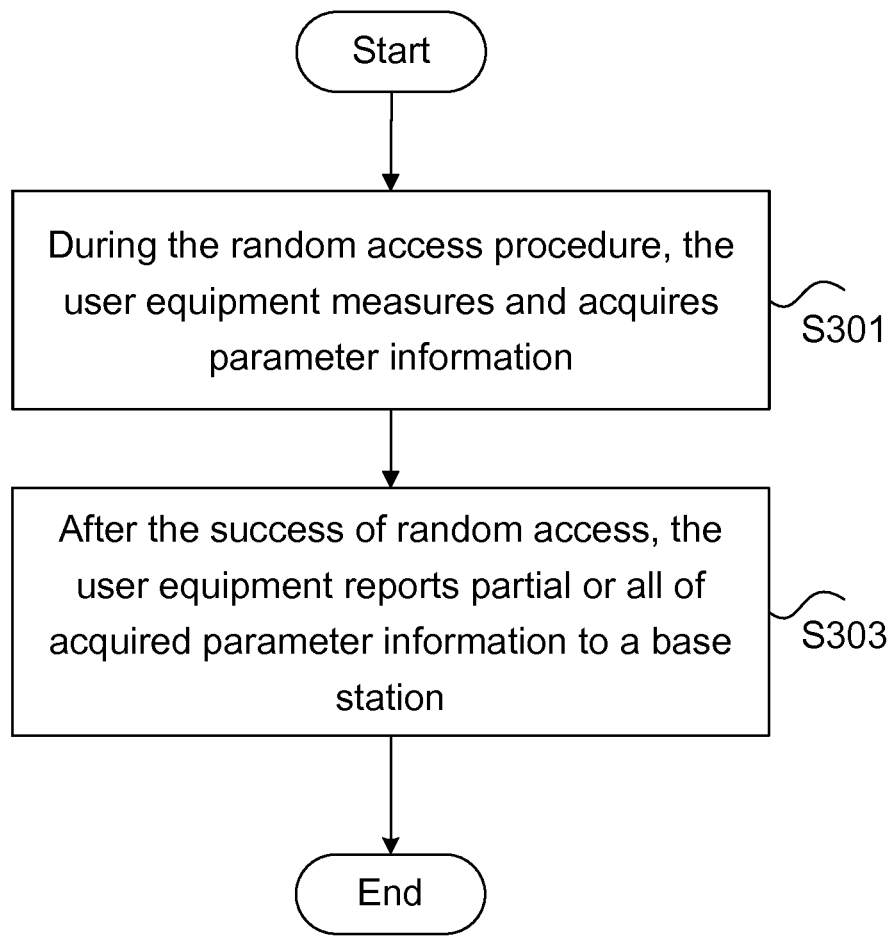
FIG. 3 shows a flowchart illustrating a method for acquiring random access information according to an embodiment of the present invention.

FIG. 3 shows a flowchart illustrating a method for acquiring random access information according to an embodiment of the present invention. As shown in FIG. 3, the method for acquiring random access information according to the embodiment of the present invention mainly comprises the following steps (steps S301-S303):

step S301: during a random access procedure, a UE measures and acquires parameter information in the random access procedure (the measuring process may comprises counting the parameter information); and step S303: after the success of the random access, the UE reports partial or all of acquired parameter information to a base station.

The procedure is further described below in detail.

(I) Step S301

In the embodiments of the present invention, in the competition-based random access mode and the non-competition-based random access mode, the UE measures the parameter information by adopting different schemes; the random accesses in the two modes are respectively described below.

In the Competition-Based Random Access Mode

In the competition-based random access mode, parameters to be measured by the UE comprise but are not limited to the following 4 parameters:

(1) the number of times $N_{noRAR}$ that the UE receives no random access response from the base station within a predetermined time after the UE transmits a random access preamble during the random access procedure;

(2) the number of times $N_{Msg3max}$ that the number of messages 3 (i.e. Msg3) retransmitting times by the UE exceeds the predetermined threshold during the random access procedure;

in a specific implementation process, the predetermined threshold is a threshold of the maximum retransmitting times of the Hybrid Automatic Repeat Request (HARQ) of the message 3;

(3) the number of times $N_{ContentionTimeOut}$ that a contention resolution timer is timeout during the random access procedure; and (4) the number of times $N_{NoExpectMsg4}$ that the UE receives a non-expected message 4 (i.e. Msg4).

Specifically, the above measured parameter information may comprise parameters indicating contention information and parameters indicating delay information in the random access procedure. The meaning of each measured parameter and the indicated information thereof are specifically shown in Table 1.

TABLE 1

| Measurement item | Meaning | Indicated information |
|---|---|---|
| $N_{noRAR}$ | Number of times that the user equipment receives no random access response from the base station within a predetermined time after the UE transmits a random access preamble | Over-low transmitting power of the random access preamble |
| $N_{Msg3max}$ | Number of times that the number of Msg3 retransmitting times exceeds its predetermined threshold | Over-high disturbance of the current channel |
| $N_{ContentionTimeOut}$ | Number of times that a contention resolution timer is timeout | Contention occurs during the random access |
| $N_{NoExpectMsg4}$ | Number of times that the user equipment receives a non-expected messages 4 | Contention occurs during the random access |

In a specific implementation process, the step that the UE measures and counts the above parameter information in the random access procedure in the competition-based random access mode may comprise the following steps:

step 1: the UE initiates a random access procedure and resets the counter, the $N_{noRAR}$, $N_{Msg3max}$, $N_{ContentionTimeOut}$ and $N_{NoExpectMsg4}$, wherein the counter is used for counting the number of times that the UE transmits a random access preamble during the random access procedure;

step 2: the UE transmits the random access preamble to the base station and the counter is increased by 1;

step 3: the UE determines whether a random access response is received within a predetermined time, if received, executes step 4; otherwise, the $N_{noRAR}$ is increased by 1, then executes step 7;

step 4: the UE transmits an Msg3 to the base station and starts the contention resolution timer; the UE retransmits the Msg3 when receiving a response message from the base station indicating that the Msg3 has not been received (i.e. Negative Acknowledgement message, NACK message), restarts the contention resolution timer and determines whether the number of retransmitting times exceeds the predetermined threshold, if exceeds, the $N_{Msg3max}$ is increased by 1, then executes step 7; otherwise, executes step 5;

step 5: the UE determines whether a contention resolution message is received from the base station before the contention resolution timer is timeout, if received, executes step 6; otherwise, the $N_{ContentionTimeOut}$ is increased by 1, then executes step 7;

step 6: the UE determines whether the Msg4 received from the base station is a predetermined Msg4, if the Msg4 is a predetermined one, the measurement is over; otherwise, the $N_{NoExpectMsg4}$ is increased by 1, then executes step 7;

wherein the predetermined Msg4 is the Msg4 expected to be received by the UE; and step 7: determining whether the value of the counter reaches a predetermined threshold, if reaches, the measurement is over; otherwise, executes Step 2.

In the Non-Competition-Based Random Access Mode

In this mode, parameters to be measured by the UE comprise but are not limited to:

(1) a number of times $N_{noRAR}$ that the UE receives no random access response from the base station within a predetermined time after the UE transmits a random access preamble during the random access procedure.

Specifically, the meaning of the measured parameter information and the indicated information thereof are shown in Table 2.

TABLE 2

| Measurement item | Meaning | Indicated information |
|---|---|---|
| $N_{noRAR}$ | Number of times that the user equipment receives no random access response from the base station within a predetermined time after the UE transmits a random access preamble (or, number of times that the user equipment retransmits a random access preamble) | Over-low transmitting power of the random access preamble |

In a specific implementation process, the step that the UE counts to measure the parameter information in the random access procedure in the non-competition-based random access mode mainly comprises the following steps:

step 1: the UE initiates a random access procedure and resets the counter and the $N_{noRAR}$, wherein the counter is used for counting the number of times that the UE transmits a random access preamble during the random access procedure;

step 2: the UE transmits the random access preamble to the base station and the counter is increased by 1;

step 3: the UE determines whether a random access response is received within a predetermined time, if received, the measurement is over; otherwise, the $N_{noRAR}$ is increased by 1, then executes step 4; and step 4: determining whether the value of the counter reaches a predetermined threshold, if the value reaches the predetermined threshold, the measurement is over; otherwise, executes step 2.

In the specific implementation process, in order to ensure the completeness of the measuring process of a random access, the measurement is only considered to be complete when the random access procedure is ended due to contention resolution of the random access or that the number of preamble retransmitting times by the UE exceeds the maximum allowable number of transmitting times. In the above measurement, all the parameters reported by the UE are the ones measured in the above-described complete measurement.

In addition, if the random access of the UE is failed (i.e., the UE determines that the value of the counter reaches its predetermined threshold), optionally, the UE can temporarily store the measurement result which can be reported with other new measurement results after success of a next random access. However, if the UE is subjected to inter-cell switching or leaves original service cell through cell selection or reselection, or the service cell is subjected to system information update during the period, the UE determines that the temporarily stored measurement result is invalid and needs to be removed.

(II) Step S303

Specifically, the ways that the UE reports the measured parameter information to the base station comprise but are not limited to the following two ways:

(1) the UE reports the measured parameter information when receiving a measurement request from the base station; and (2) the UE automatically reports the measured parameter information after measuring the parameter information.

The two ways are respectively described below.

Figure 4:
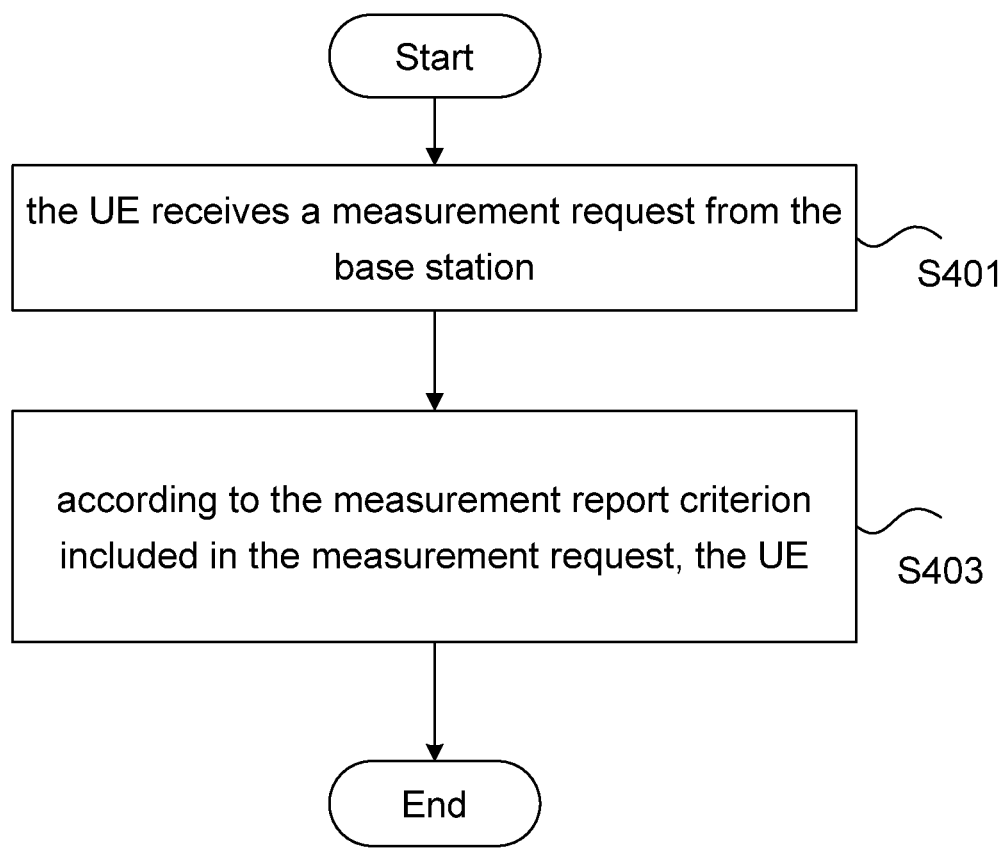
FIG. 4 shows a flowchart illustrating a method for acquiring random access information according to a preferred embodiment of the present invention.

FIG. 4 shows a flowchart illustrating that the UE reports the acquired parameter information in the first way. As shown in FIG. 4, the step that the UE reports the parameter information under such a condition mainly comprises the following steps:

step S401: the UE receives a measurement request from the base station, wherein the measurement request includes a measurement report criterion;

specifically, the measurement report criterion comprises but not limited to: reporting all the measured parameter information or reporting the parameter information meeting a predetermined condition;

wherein the predetermined condition comprises: reporting a parameter in the above four parameters whose measurement values meet a certain given threshold; and step S403: the UE transmits partial or all of the parameter information to the base station according to the measurement report criterion included in the measurement request;

specifically, if the measurement report criterion is reporting all the measured parameters, the UE transmits all the acquired parameter information to the base station; and if the measurement report criterion is reporting the parameter information meeting the predetermined condition, the UE transmits the parameter information meeting the predetermined condition in all acquired parameter information to the base station.

If the second way is adopted, after acquiring the parameter information, the UE automatically reports the acquired parameter information to the base station after the completion of the random access procedure. Specifically, the UE may also report the parameter information to the base station according to a predetermined measurement report criterion; the specific implementation process is similar to that described above, thus needing no further description. Further, the predetermined measurement report criterion may be a system default setting or may be notified to the UE by the base station through a cell system information broadcast.

According to the method for measuring the random access information provided by the embodiment of the present invention, the UE may measure the parameter information in the random access procedure and report the measured parameter information to the base station.

The method for acquiring the random access information provided by the embodiment of the present invention is described below by taking the competition-based random access mode and the non-competition-based random access mode respectively as examples.

Figure 5:
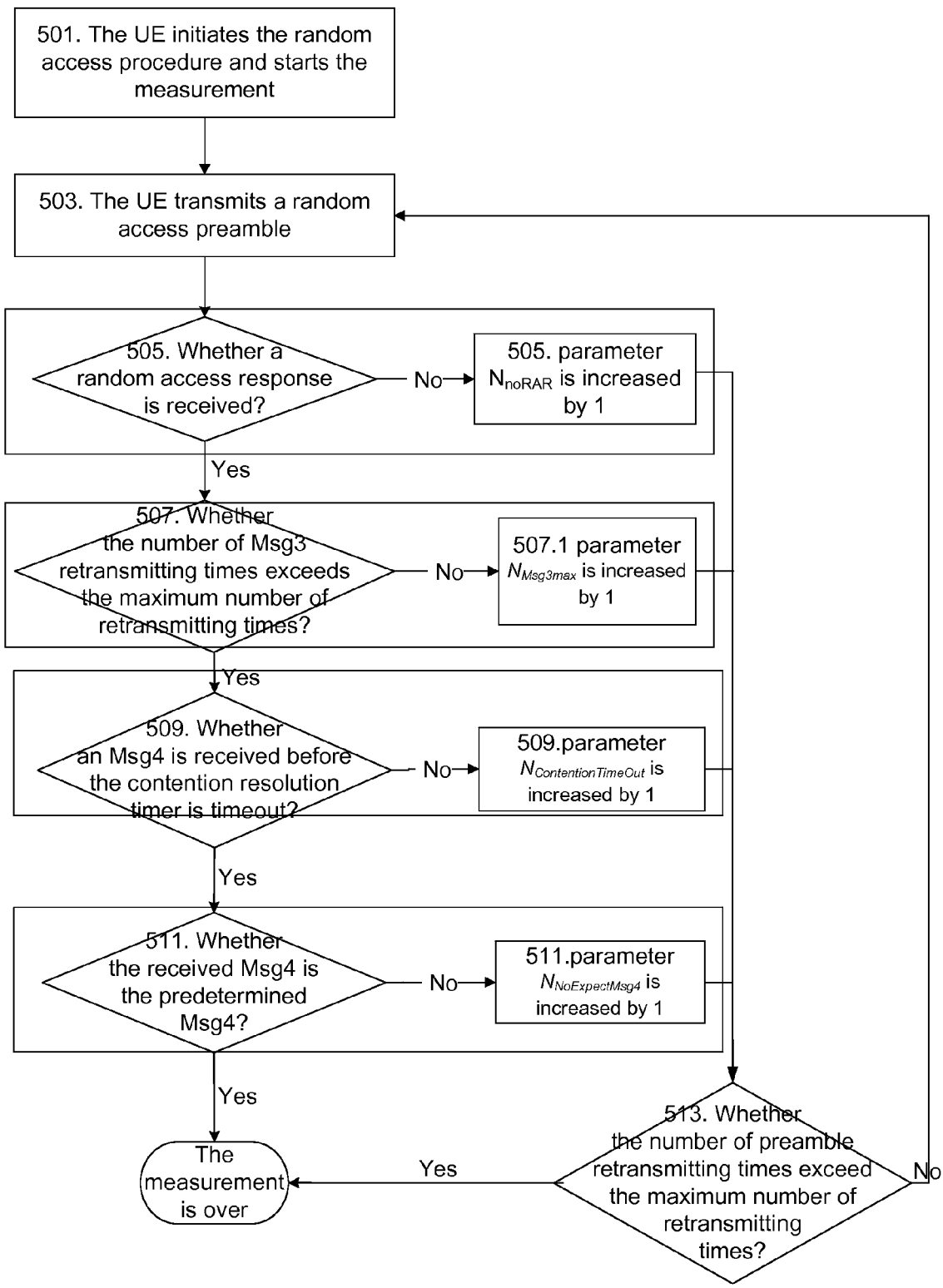
FIG. 5 shows a flowchart illustrating a method for measuring information in a competition-based random access according to an embodiment of the present invention.

FIG. 5 shows a flowchart illustrating a method for acquiring information in the competition-based random access according to an embodiment of the present invention. As shown in FIG. 5, the method for acquiring information in the competition-based random access according to the embodiment of the present invention mainly comprises the following steps (steps S501-S513):

step S501: a UE initiates a random access procedure and starts a measurement;

step S503: the UE transmits a random access preamble to a base station (i.e. an eNB);

step S505: the UE determines whether a random access response is received within a predetermined time, if received, executes S507; otherwise, the $N_{noRAR}$ is increased by 1, then executes S513;

step S507: the UE determines whether the number of Msg3 retransmitting times exceeds the maximum number of retransmitting times designated by an HARQ, if exceeds, the $N_{Msg3max}$ is increased by 1, then executes S513; otherwise, executes S509;

step S509: the UE determines whether a contention resolution message is received from the base station before the contention resolution timer is timeout, if received, executes S511; otherwise, the $N_{ContentionTimeOut}$ is increased by 1, then executes S513;

step S511: the UE determines whether the contention resolution message received from the base station is a predetermined contention resolution message, if yes, the measurement is over; otherwise, the $N_{NoExpectMsg4}$ is increased by 1, then executes S513; and step S513: the UE determines whether the number of preamble retransmitting times exceeds the maximum number of retransmitting times, i.e., the UE determines whether the value of a counter reaches its predetermined threshold, if reaches, the measurement is over; otherwise, executes S503.

Figure 6:
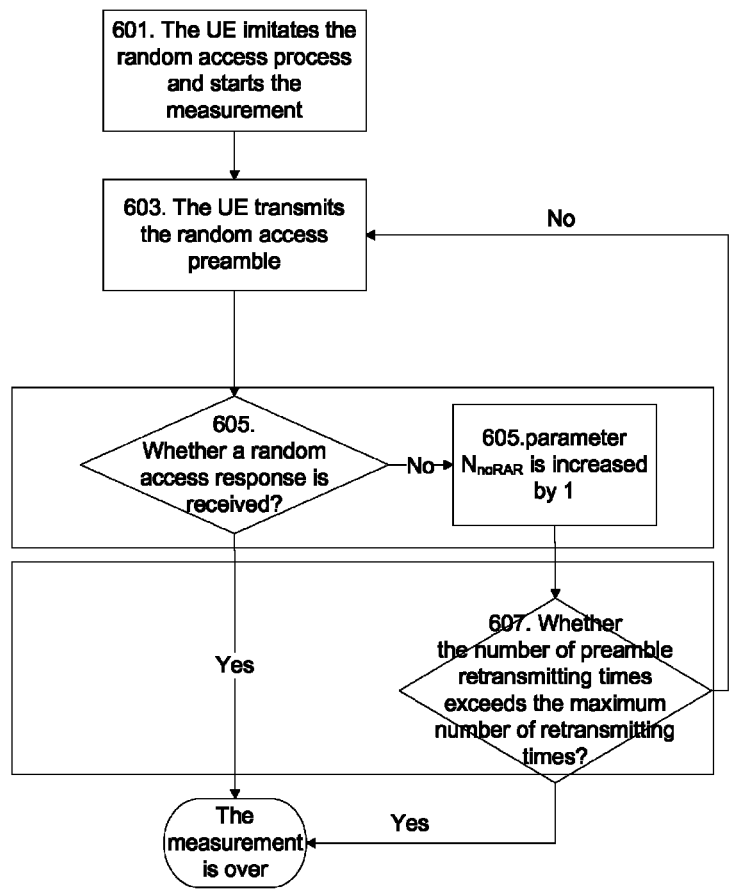
FIG. 6 shows a flowchart illustrating a method for measuring information in a non-competition-based random access according to an embodiment of the present invention.

FIG. 6 shows a flowchart illustrating a method for acquiring information in the non-competition-based random access according to an embodiment of the present invention. As shown in FIG. 6, the method for acquiring information in the non-competition-based random access according to the embodiment of the present invention mainly comprises the following steps (steps S601-S607):

step S601: a UE initiates a random access procedure and starts a measurement;

step S603: the UE transmits a random access preamble to a base station (i.e. an eNB);

step S605: the UE determines whether a random access response is received within a predetermined time, if received, the measurement is over; otherwise, the $N_{noRAR}$ is increased by 1, then executes S607; and step S607: the UE determines whether the number of preamble retransmitting times exceeds the maximum number of retransmitting times, i.e., the UE determines whether the value of a counter reaches its predetermined threshold, if reaches, the measurement is over; otherwise, executes S603.

Device Embodiments

According to an embodiment of the present invention, a UE is provided, wherein the UE may be used for implementing the method for acquiring the random access information provided by the embodiments of the present invention.

Figure 7:
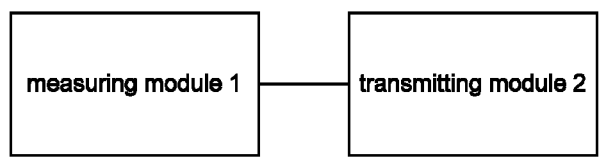
FIG. 7 shows a diagram illustrating the structure of a UE according to an embodiment of the present invention.

FIG. 7 shows a diagram illustrating the structure of a UE according to an embodiment of the present invention. As shown in FIG. 7, the UE according to the embodiment of the present invention comprises a measuring module 1 and a transmitting module 2. The measuring module 1 is arranged to measure and acquire parameter information in a random access procedure. The transmitting module 2 is connected with the measuring module 1 and is arranged to transmit partial or all of parameter information acquired by the measuring module to a base station.

Specifically, for the competition-based random access mode, the parameters measured by the measuring module 1 comprise but are not limited to the above-described $N_{noRAR}$, $N_{Msg3max}$, $N_{ContentionTimeOut}$ and $N_{NoExpectMsg4}$.

For the non-competition-based random access mode, the parameters measured by the measuring module 1 comprise but are not limited to the above-described $N_{noRAR}$.

In conclusion, through the embodiment of the present invention, the problem of failing to acquire information reflecting contention, delay and the like in the random access procedure in the related technology is solved by measuring and reporting the random access information by the UE, so that the base station can acquire more precise and comprehensive random access information, furthermore, the optimization achieved by a random access optimization functional entity is more precise, thereby the performance of the system and the user experience are improved.

Obviously, those skilled in the art shall understand that the modules or steps of the present invention may be implemented by general computing devices, and may be centralized in a single computing device or distributed in a network consisting of multiple computing devices. Optionally, the modules or steps may be realized by program codes executable by the computing devices, which can be stored in a storage device and executed by the computing device; or the modules or steps may be respectively made into integrated circuit modules; or a plurality of the modules or steps may be made into a single integrated circuit module. By doing so, the present invention is not limited to any specific combination of hardware and software.

The above are only preferred embodiments of the present invention and not intended to limit the present invention. For those skilled in the art, the present invention may have various modifications and changes. Any modifications, equivalent replacements, improvements and the like within the spirit and principle of the present invention shall fall within the scope of protection of the present invention.

What is claim is:

1. A method for acquiring random access information in a Long Term Evolution (LTE) system, comprising:
   during a random access procedure in a competition-based random access mode, measuring and acquiring parameter information in the random access procedure by a user equipment; and
   after the success of the random access, reporting partial or all of acquired parameter information by the user equipment to a base station,
   the step of measuring parameter information in the random access process by the user equipment comprises:
   the user equipment initiating the random access process and resetting a counter, $N_{noRAR}$, $N_{Msg3max}$, $N_{ContentionTimeOut}$ and $N_{NoExpectMsg4}$, the counter used for counting a number of times that the user equipment transmits a random access preamble during the random access process the $N_{noRAR}$ representing a number of times that the UE receives no random access response from the base station within a predetermined time after the user equipment transmits a random access preamble during the random access process, the $N_{Msg3max}$ representing a number of times that the number of messages 3 of the LTE system retransmitting times by the user equipment exceeds a first predetermined threshold during the random access process, the $N_{ContentionTimeOut}$ representing a number of times that a contention resolution timer is timeout during the random access process, the $N_{NoExpectMsg4}$ representing a number of times that the user equipment receives a non-expected message 4 of the LTE system;
   step 1, the user equipment transmits a random access preamble to the base station and the counter is increased by 1;
   step 2, the user equipment determines whether a random access response is received within a predetermined time, if received, executes Step 3; otherwise, the $N_{noRAR}$ is increased by 1, then executes Step 6;
   step 3, the user equipment transmits a message 3 to the base station and starts the contention resolution timer; the user equipment retransmits the message 3 when receiving a response message from the base station indicating that the message 3 has not been received, restarts the contention resolution timer and determines whether the number of retransmitting times exceeds the first predetermined threshold, if exceeds, the $N_{Msg3max}$ is increased by 1, then executes step 6; otherwise executes step 4;
   step 4, the user equipment determines whether a message 4 is received from the base station before the contention resolution timer is timeout, if received, executes Step 5; otherwise, the $N_{ContentionTimeOut}$ is increased by 1, then executes step 6;
   step 5, the user equipment determines whether the message 4 received from the base station is a predetermined message 4 that is expected to be received by the UE, if yes, the measurement is over; otherwise, the $N_{NoExpectMsg4}$ is increased by 1 then executes step 6; and
   step 6, determining whether the value of the counter reaches a second predetermined threshold, if reaches, the measurement is over; otherwise, executes step 1.

2. The method according to claim 1, wherein the step of reporting partial or all of the parameter information by the user equipment to the base station comprises:
   the user equipment receiving a measurement request from the base station, wherein the measurement request includes a measurement report criterion; and
   the user equipment transmitting partial or all of the parameter information to the base station according to the measurement report criterion included in the measurement request.

3. The method according to claim 1, wherein the step of reporting partial or all of the parameter information by the user equipment to the base station comprises:
   after the success of the random access, the user equipment transmitting partial or all of the parameter information to the base station according to a measurement report criterion, wherein the measurement report criterion comprises the report criterion of a predetermined default value or notifying the user equipment through a system information broadcast.

4. The method according to claim 2, wherein under the condition that the measurement report criterion is reporting all measured parameter information, the step that the user equipment transmits partial or all of the parameter information to the base station comprises: the user equipment transmits all acquired parameter information to the base station.

5. The method according to claim 2, wherein under the condition that the measurement report criterion is reporting the parameter information meeting a predetermined condition, the step that the user equipment transmits partial or all of the parameter information to the base station comprises: the user equipment transmits the parameter information meeting the predetermined condition in all acquired parameter information to the base station.

6. A method for acquiring random access information in a Long Term Evolution (LTE) system, comprising:
   during a random access process in a non-competition-based random access mode, measuring and acquiring parameter information in the random access process by a user equipment; and
   after the success of the random access, reporting partial or all of acquired parameter information by the user equipment to a base station, wherein the step that the user equipment measures the random access procedure comprises:

the user equipment initiating the random access procedure and resetting a counter and $N_{noRAR}$, wherein the counter is used for counting the number of times that the user equipment transmits a random access preamble during the random access procedure, the NnoRAR representing the number of times that the user equipment receives no random access response from the base station within a predetermined time after the user equipment transmits a random access preamble during the random access procedure;

step 1, the user equipment transmits a random access preamble to the base station and the counter is increased by 1;

step 2, the user equipment determines whether a random access response is received within a predetermined time, if received, executes step 3; otherwise, the $N_{noRAR}$ is increased by 1, then executes step 3; and step 3, determining whether the value of the counter reaches a third predetermined threshold, if reaches, the measurement is over; otherwise, executes step 1.

7. A user equipment used in a Long Term Evolution (LTE) system, comprising:

a measuring module arranged to measure and acquire parameter information in a random access procedure in a competition-based random access mode; and a transmitting module including a circuit arranged to transmit partial or all of parameter information acquired by the measuring module to the base station, the measuring module is used to perform:

initiating the random access process and resetting a counter $N_{noRAR}$, $N_{Msg3max}$, $N_{ContentionTimeOut}$ and $N_{NoExpectMsg4}$, the counter used for counting a number of times that the user equipment transmits a random access preamble during the random access process, the $N_{noRAR}$ representing a number of times that the UE receives no random access response from the base station within a predetermined time after the user equipment transmits a random access preamble during the random access process, the $N_{Msg3max}$ representing a number of times that the number of messages 3 of the LTE system retransmitting times by the user equipment exceeds a first predetermined threshold during the random access process, the $N_{ContentionTimeOut}$ representing a number of times that a contention resolution timer is timeout during the random access process, the $N_{NoExpectMsg4}$ representing a number of times that the user equipment receives a non-expected message 4 of the LTE system;

step 1, the user equipment transmits a random access preamble to the base station and the counter is increased by 1;

step 2, the user equipment determines whether a random access response is received within a predetermined time, if received, executes Step 3; otherwise, the $N_{noRAR}$ is increased by 1, then executes Step 6;

step 3, the user equipment transmits a message 3 to the base station and starts the contention resolution timer; the user equipment retransmits the message 3 when receiving a response message from the base station indicating that the message 3 has not been received, restarts the contention resolution timer and determines whether the number of retransmitting times exceeds the first predetermined threshold, if exceeds, the $N_{Msg3max}$ is increased by 1, then executes step 6; otherwise executes step 4;

step 4, the user equipment determines whether a message 4 is received from the base station before the contention resolution timer is timeout, if received, executes Step 5; otherwise, the $N_{ContentionTimeOut}$ is increased by 1, then executes step 6;

step 5, the user equipment determines whether the message 4 received from the base station is a predetermined message 4 that is expected to be received by the UE, if yes the measurement is over otherwise the $N_{NoExpectMsg4}$ is increased by 1, then executes step 6; and step 6, determining whether the value of the counter reaches a second predetermined threshold, if reaches, the measurement is over; otherwise, executes step 1.

8. The method according to claim 3, wherein under the condition that the measurement report criterion is reporting all measured parameter information, the step that the user equipment transmits partial or all of the parameter information to the base station comprises: the user equipment transmits all acquired parameter information to the base station.

9. The method according to claim 3, wherein under the condition that the measurement report criterion is reporting the parameter information meeting a predetermined condition, the step that the user equipment transmits partial or all of the parameter information to the base station comprises: the user equipment transmits the parameter information meeting the predetermined condition in all acquired parameter information to the base station.

10. The method according to claim 6, wherein the step of reporting partial or all of the parameter information by the user equipment to the base station comprises:

the user equipment receiving a measurement request from the base station, wherein the measurement request includes a measurement report criterion; and the user equipment transmitting partial or all of the parameter information to the base station according to the measurement report criterion included in the measurement request.

11. The method according to claim 6, wherein the step of reporting partial or all of the parameter information by the user equipment to the base station comprises:

after the success of the random access, the user equipment transmitting partial or all of the parameter information to the base station according to a measurement report criterion, wherein the measurement report criterion comprises the report criterion of a predetermined default value or notifying the user equipment through a system information broadcast.

12. The method according to claim 10, wherein under the condition that the measurement report criterion is reporting all measured parameter information, the step that the user equipment transmits partial or all of the parameter information to the base station comprises: the user equipment transmits all acquired parameter information to the base station.

13. The method according to claim 11, wherein under the condition that the measurement report criterion is reporting all measured parameter information, the step that the user equipment transmits partial or all of the parameter information to the base station comprises: the user equipment transmits all acquired parameter information to the base station.

14. The method according to claim 10, wherein under the condition that the measurement report criterion is reporting the parameter information meeting a predetermined condition, the step that the user equipment transmits partial or all of the parameter information to the base station comprises: the user equipment transmits the parameter information meeting the predetermined condition in all acquired parameter information to the base station.

15. The method according to claim 11, wherein under the condition that the measurement report criterion is reporting the parameter information meeting a predetermined condition, the step that the user equipment transmits partial or all of the parameter information to the base station comprises: the user equipment transmits the parameter information meeting the predetermined condition in all acquired parameter information to the base station.

16. A user equipment used in a Long Term Evolution (LTE) system, comprising:
  a measuring module arranged to measure and acquire parameter information in a random access process in a non-competition-based random access mode; and
  a transmitting module including a circuit and arranged to transmit partial or all of parameter information acquired by the measuring module to the base station, characterized in that,
  the measuring module is used to perform:
  initiating the random access process and resetting a counter and $N_{noRAR}$, wherein the counter is used for counting the number of times that the user equipment transmits a random access preamble during the random access process the $N_{noRAR}$ representing the number of times that the user equipment receives no random access response from the base station within a predetermined time after the user equipment transmits a random access preamble during the random access process;

step 1, the user equipment transmits a random access preamble to the base station and the counter is increased by 1;

step 2, the user equipment determines whether a random access response is received within a predetermined time, if received, executes step 3; otherwise, the $N_{noRAR}$ is increased by 1, then executes step 3; and step 3, determining whether the value of the counter reaches a third predetermined threshold, if reaches, the measurement is over; otherwise, executes step 1.

* * * * *